United States Patent Office
2,878,265
Patented Mar. 17, 1959

2,878,265
PRODUCTION OF METHYLENEDIOXYPHENYL DERIVATIVES

Herman Wachs and Sylvan E. Forman, Baltimore, Md., assignors to Food Machinery and Chemical Corporation, New York, N. Y., a corporation of Delaware No Drawing. Application September 10, 1956
Serial No. 608,697

10 Claims. (Cl. 260—340.5)

This invention relates to an improved process for the manufacture of dihydrosafrol derivatives, particularly chloromethyl dihydrosafrol and compounds for which chloromethyl dihydrosafrol is an essential intermediate.

Chloromethyl dihydrosafrol has the structural formula

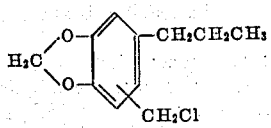

This compound has been used as an intermediate in the production of insecticides and synergists of the class represented by the formula

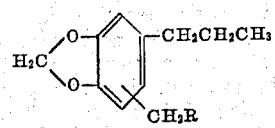

A particularly effective synergist of this class is that in which R is the butyl Carbitol radical. This synergist, commonly known as "piperonyl butoxide," may be obtained by reacting the sodium salt of diethylene glycol monobutyl ether with chloromethyl dihydrosafrol. The preparation and properties of both the intermediate compound and the final products have been described in U. S. Patents Nos. 2,485,680 and 2,485,681, inventions of Herman Wachs.

U. S. Patent No. 2,485,680 describes the chloromethylation of dihydrosafrol. The present invention is a novel and useful improvement on that process. As a result of this invention, substantially pure chloromethyl dihydrosafrol is now produced. In addition, this pure product is produced in quantitative yield and in a fraction of the time that was previously required. The pure chloromethyl dihydrosafrol may then be used directly, without further purification, to produce compounds such as piperonyl butoxide.

As described in U. S. Patent 2,485,680 mentioned above, chloromethyl dihydrosafrol is prepared by reacting dihydrosafrol with 40% formaldehyde solution and concentrated hydrochloric acid, by mixing and agitating for 36 hours at a temperature below 20° C. Under these conditions the major product is the desired chloromethyl derivative. However, this reaction is accompanied by side reactions which substantially reduce the yield and quality of the desired product. The most objectionable side reaction has been found to be the formation of a dimer, as shown in the following equation:

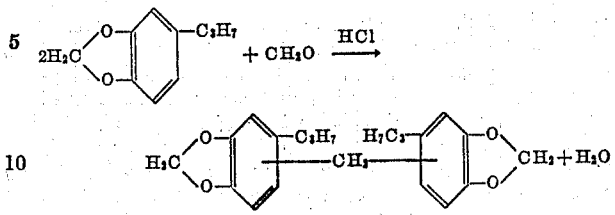

This diphenylmethane derivative is a white solid melting at 71.5° C. Substantial quantities of this dimer, and higher polymers, are formed when the procedure of U. S. Patent No. 2,485,680 is followed, so that the desired chloromethyl dihydrosafrol must be separated and purified by vacuum distillation before it may be reacted further to produce the insecticides and synergists for which chloromethyl dihydrosafrol is a valuable intermediate. But since benzyl chlorides in general tend to polymerize rapidly when heated, even vacuum distillation of the chloromethyl dihydrosafrol does not avoid the formation of an added residue, which reduces the yield even further.

The formation of these polymerization products are virtually eliminated by the improved method which is the subject of this invention. Thus, purification of chloromethyl dihydrosafrol is no longer necessary. The elimination of the purification step is an important operational advantage in the synthesis of insecticides such as piperonyl butoxide.

In the light of the known behavior of chloromethyl dihydrosafrol on heating, it was indeed surprising to discover that there are conditions of elevated temperature wherein this product may be formed in quantative yield, and in such a high state of purity that it may be used in further syntheses without distilling to remove side products. In addition, the dimerization observed at low temperatures is also eliminated.

It has now been discovered that, at certain concentrations of hydrochloric acid, the chloromethylation reaction mixture can be heated as high as 90° C., yet the traditional dimerization or polymerization of the product does not occur. And the reaction is completed in 3-4 hours instead of the 36 hours previously required.

The prior art in this field did not recognize that it is possible, under certain conditions, to carry out this chloromethylation reaction in a way which both inhibits side reactions and accelerates the overall reaction. The preferred process described in Wachs Patent No. 2,485,680 teaches that the reaction temperature should be maintained below 20° C. Although the disclosure therein suggests that variations in temperature, reagents and concentration are permissible, there is no indication that higher temperatures may be used to advantage. On the contrary, the chemistry of safrol-type compounds suggests that increasing both the temperature and concentrations of the reagents would be undesirable. For example, hot concentrated hydrochloric acid might be expected to cleave the oxymethyl group of the dihydrosafrol. Further, high temperatures and high concentrations of reagents might be expected to produce a great deal of polychloromethylation and methylene bridging, especially because of the fact that the relatively mild conditions of the prior art process produce a substantial amount of dimer due to methylene bridging.

It was surprising that the high temperatures and concentrations of the present invention did not split the dioxymethylene linkage, did not cause significant polychloromethylation, and actually reduced the amount of methylene bridging. These conditions did increase the yield of desired product and greatly accelerated the rate of desired reaction. By the preferred procedure of the prior art, the yield of chloromethyldihydrosafrol from purified dihydrosafrol was 60% of the theoretical amount, and the yield of "piperonyl butoxide" from the chloride was 80% of the theoretical amount, making the overall yield of "piperonyl butoxide" 48%. By the improved procedure taught herein the yields of chloromethyl dihydrosafrol are 95–100% of theoretical, and the overall yield of "piperonyl butoxide" is 80% of theoretical.

In the improved process of the present invention, it is essential that the hydrochloric acid concentration be maintained at a high level. The acid concentration of the aqueous phase at the end of the reaction should be about 7.5–9.5 molar in hydrogen chloride, with a preferred range of about 8.5–9.5. Under these conditions the reaction can be carried out at much higher temperatures than was possible previously, and in a much shorter time. When the normality drops below about 6.5 the yield of product drops off sharply. Above about 9.5 the saturation value of the solution at these temperatures (and atmospheric pressure) is exceeded, so that it would be necessary to operate at lower temperatures.

This high acid concentration may be obtained by using a polymer of formaldehyde in the reaction system containing concentrated hydrochloric acid, instead of aqueous formaldehyde. Formaldehyde polymers are reversible polymers, and react chemically as solid forms of formaldehyde. Paraformaldehyde, a convenient form for use in this invention, is defined as a mixture of polyoxymethylene glycols containing 91–99% formaldehyde and melting at 120–170° C., and having the structure HO—$(CH_2O)_n$—H, where $n=6$–100. About 1.1–1.4 moles of formaldehyde per mole of dihydrosafrol give best results under these conditions, although slightly higher amounts of formaldehyde do not have a marked adverse effect on the yields.

If aqueous formaldehyde should be used, the necessary high acid concentration may be obtained by bubbling gaseous hydrogen chloride into the solution of formaldehyde and dihydrosafrol, and continuing the bubbling during the reaction to obtain the concentrated mixture necessary by the end of the reaction. In a system using a solid formaldehyde polymer such as paraformaldehyde, this should first be dissolved in water before hydrogen chloride gas is bubbled in.

These reactions are preferably carried out at temperatures in the range of 80° to 85° C. At lower temperatures, such as 60° C., not only is the reaction slower, but the yields are poorer. At higher temperatures some materials tend to distil and some gases are lost, these effects becoming significant over about 90° C. In the preferred temperature range of 80°–85° C. the reaction is completed within about 4 hours.

As starting materials in this process, either purified dihydrosafrol or hydrogenated *Ocotea cymbarum* (Brazilian sassafras oil containing approximately 90% safrol) may be used. In the prior art process only the purified raw material gave adequate results.

A preferred practice of this invention is illustrated as follows:

One hundred and eighty-two grams (one mole) of 90% dihydrosafrol, 40 grams (1.27 moles of 95% formaldehyde) of paraformaldehyde and 395 grams (4.1 moles) of 38% hydrochloric acid were stirred and heated at 80° C. for four hours. The organic and aqueous layers were separated. The oily layer contained 229 grams of 95% chloromethyl dihydrosafrol. This product was reacted without further purification with the sodium salt of diethylene glycol monobutyl ether, by the method described in U. S. Patent 2,485,681, to produce the synergist "piperonyl butoxide."

Pursuant to the requirement of the patent statutes, this invention has been explained and exemplified so that it may be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. An improved process for preparing chloromethyl dihydrosafrol, comprising reacting dihydrosafrol with an aqueous system containing excess formaldehyde and hydrogen chloride at a temperature of about 60–90° C., adjusting the hydrogen chloride concentration whereby the concentration of the aqueous phase at the end of the reaction is about 7.5–9.5 molar in hydrogen chloride.

2. An improved process for preparing chloromethyl dihydrosafrol, comprising reacting dihydrosafrol with an aqueous system containing about 1.1–1.4 moles of formaldehyde and at least about 2 moles of hydrogen chloride per mole of dihydrosafrol at a temperature of about 60–90° C., whereby the concentration of the aqueous phase at the end of the reaction is about 7.5–9.5 molar in hydrogen chloride.

3. An improved process for preparing chloromethyl dihydrosafrol, comprising reacting dihydrosafrol with an excess of a solid polymer of formaldehyde and an excess of concentrated hydrochloric acid at a temperature of about 60–90° C., adjusting the hydrochloric acid concentration whereby the concentration of the aqueous phase at the end of the reaction is about 8.5–9.5 molar in hydrogen chloride.

4. An improved process for preparing chloromethyl dihydrosafrol, comprising reacting dihydrosafrol with an excess of paraformaldehyde and an excess of concentrated hydrochloric acid at a temperature of about 60–90° C., adjusting the hydrochloric acid concentration whereby the concentration of the aqueous phase at the end of the reaction is about 8.5–9.5 molar in hydrogen chloride.

5. An improved process for preparing chloromethyl dihydrosafrol, comprising reacting dihydrosafrol with paraformaldehyde equivalent to about 1.1–1.4 moles of formaldehyde per mole of dihydrosafrol and about a 4 molar excess of concentrated hydrochloric acid per mole of dihydrosafrol, at a temperature of about 80° C.

6. An improved process for preparing chloromethyl dihydrosafrol, comprising reacting hydrogenated safrol-bearing oils with an aqueous system containing excess formaldehyde and hydrogen chloride at a temperature of about 60–90° C., adjusting the hydrogen chloride concentration whereby the concentration of the aqueous phase at the end of the reaction is about 7.5–9.5 molar in hydrogen chloride.

7. An improved process for preparing chloromethyl dihydrosafrol, comprising reacting dihydrosafrol with an aqueous solution of excess formaldehyde and gaseous hydrogen chloride at a temperature of about 60–90° C., adjusting the hydrogen chloride concentration by bubbling gaseous hydrogen chloride into the solution so that the concentration of the aqueous phase at the end of the reaction is at least about 7.5 molar in hydrogen chloride.

8. An improved process for preparing chloromethyl dihydrosafrol, comprising reacting dihydrosafrol with an aqueous solution of formaldehyde containing about 1.1–1.4 moles of formaldehyde per mole of dihydrosafrol and excess dissolved hydrogen chloride at a temperature of about 80° C., bubbling gaseous hydrogen chloride into the solution at a rate adequate to maintain the concentration of the aqueous phase at about 8.5–9.5 molar in hydrogen chloride.

9. An improved process for preparing chloromethyl dihydrosafrol, comprising reacting hydrogenated safrol-bearing oils with an aqueous solution of a formaldehyde polymer and gaseous hydrogen chloride at a temperature of about 60–90° C., adjusting the hydrogen chloride concentration by bubbling gaseous hydrogen chloride into the solution so that the concentration of the aqueous phase at the end of the reaction is at least about 7.5 molar in hydrogen chloride.

10. An improved process for preparing chloromethyl dihydrosafrol, comprising reacting hydrogenated safrol-bearing oils with an aqueous solution of paraformaldehyde equivalent to about 1.1–1.4 moles of formaldehyde per mole of dihydrosafrol and gaseous hydrogen chloride at a temperature of about 60–90° C., adjusting the hydrogen chloride concentration by bubbling gaseous hydrogen chloride into the solution so that the concentration of the aqueous phase at the end of the reaction is at least about 7.5 molar in hydrogen chloride.

References Cited in the file of this patent

UNITED STATES PATENTS

| | | |
|---|---|---|
| 2,485,600 | Hedenburg | Oct. 25, 1949 |
| 2,485,680 | Wachs | Oct. 25, 1949 |
| 2,485,681 | Wachs | Oct. 25, 1949 |